United States Patent

[11] 3,588,430

| [72] | Inventors | Arthur Appel<br>Bronx;<br>Edward J. Taschler, Hopewell Junction,<br>both of N.Y. |
|------|-----------|---------------------------------------------------------------------------------|
| [21] | Appl. No. | 609,144 |
| [22] | Filed     | Jan. 13, 1967 |
| [45] | Patented  | June 28, 1971 |
| [73] | Assignee  | International Buisness Machines<br>Corporation<br>Armonk, N.Y. |

[54] FABRICATION OF COMPLEX ELECTRODES BY PHOTOETCHING FOR ELECTRICAL DISCHARGE MACHINING APPARATUS
11 Claims, 7 Drawing Figs.

[52] U.S. Cl. .................................................... 219/69, 96/36
[51] Int. Cl. ..................................................... B23p 1/08, B23p 1/04
[50] Field of Search .......................................... 219/69 (E), 69 (D), 69 (M), 69; 96/36

[56] References Cited
UNITED STATES PATENTS

| 2,800,566 | 7/1957 | Matulaitis | 219/69(E) |
|-----------|--------|------------|-----------|
| 3,035,151 | 5/1962 | Weglarz | 219/69(E) |
| 3,281,343 | 10/1966 | O'Connor | 219/69(M)X |
| 3,288,699 | 11/1966 | Trager et al. | 219/69(M)X |
| 3,067,358 | 12/1962 | De Maine | 219/69(X) |
| 3,427,423 | 2/1969 | O'Conner | 219/69 |
| 2,968,555 | 1/1961 | Bendler et al. | 96/36(X) |
| 3,200,231 | 8/1965 | Bejat | 219/69 |
| 3,333,080 | 7/1967 | De Vries | 219/69 |
| 3,334,212 | 8/1967 | Kirschenbaum | 219/69 |

Primary Examiner—R. F. Staubly
Attorney—Hanifin and Jancin

ABSTRACT: A method and apparatus are provided for accurately and inexpensively making tools to be used in EDM and in the like. Photoetching techniques are used to fabricate both a precise pattern of apertures and alignment holes in a thin metallic sheet to be used as the cathodic electrode in the EDM process used for making the tools. The photographic transparency made for photoetching may be used to fabricate many identically patterned sheets with identically located alignment holes. The thin sheet patterned electrodes, which may be readily and accurately replaced, are used in the EDM process to fabricate intricate tools which are highly precise although their fabrication requires deep erosion.

FABRICATION OF COMPLEX ELECTRODES BY PHOTOETCHING FOR ELECTRICAL DISCHARGE MACHINING APPARATUS

The invention relates to an inexpensive method of fabricating small, accurate electrodes for electrical discharge machining (EDM), of dies therefor or for ultrasonic machining, by photoetching a required pattern or its negative in a thin molybdenum or tungsten sheet which may be used directly as an electrode for cutting a workpiece, or indirectly to form a negatively contoured EDM electrode or machining die. Advantages of the photoetching process for making the pattern are that the produced electrodes and resulting tools or dies may be very complex in shape and microscopic as to holes, slots, and extensions; and of hole and projection sizes and shapes which would be very expensive and sometimes impossible to cut by conventional machining Furthermore, the presently produced photoetched electrodes are more accurately registerable, easily interchangeable, uniform, exact, and accurate in minute shaping of the contours, and more economically fabricated. The produced electrodes are stress free and not distorted while being made or used. The thin photoetched electrodes may be used either singly or in a laminated stack to form intricate electrodes of greater strength, length and rigidity.

In the photoetching of a thin electrode, any pattern which can be drawn can be photoetched, and this includes even recessed shapes which cannot be machined. Such thin electrodes are practical and economical and need not be bulky because no force is necessary in connection with such electrodes mounted for EDM. In most instances, such thin electrodes are to be shaped as the negative of the finally desired contours. It is possible to draw, in the artwork procedures commonly used for printed circuits, the required electrode contour many times larger than required, in the nature of 10 to 1,000 times the scale, and this drawings, when reduced into an actual size control film negative, serves as the etching master. The thin electrode material, although hard, can be photoetched with an accuracy of better than one-tenth of a mil. Such a thin mask of a thickness of about one to ten mils can be used as the electrode for EDM by mounting it on a rigid support with suitable alignment pins. Such alignment pins are advisable in order to reregister replacement electrode masks when a mask in use loses its accuracy due to electrode erosion. Since the alignment pin openings in such a thin electrode may be etched at the same time as the pattern, and the same film master is used repeatedly, there is a high degree of reproducible accuracy found in such a procedure.

With the present method it is possible to make electrodes which are adapted to form contours which cannot be machined, but which may be drawn by a draftsman. The inaccuracy in drafting is compensated for by the large scaling. For example, should a drawing be inaccurate to 15 mils, when such a drawing is enlarged to 1,000 times size, then such an inaccuracy becomes only fifteen-thousandths of a mil. Such photoetched accuracy exceeds the accuracy of EDM and far exceeds that of conventional machining. When duplicate electrodes are needed, it is evident that the photoetching procedure insures uniformity of repetitive pattern making. The electrode dimensions may also be adjusted photographically to compensate for EDM error. For example, if electrochemical overcut is to be approximately two-tenths of a mil, then the photograph master projection on the resist can be reduced to compensate for this.

From the foregoing it may be gathered that this invention relates in general to electrical discharge shaping and machining and more particularly to a method and apparatus for photoetching thin hard electrodes and then using such electrodes to form other more conventional punches or electrodes for EDM ultrasonic, electrochemical, or electrolytically removing material from selected portions of a workpiece so as to obtain finished articles of intricate contour such as, for example, microscopic channels and openings needed for integrated circuits, memory matrices, or small fluid logic devices, or mechanical shapes other than electronic devices. The novel method involves forming deep EDM erosion of minute shapes by the use of a thin, hard etched metal electrode on a hollow cathode. Such thin molybdenum electrode wafers are economical to make and replace when tool erosion takes place during extra deep EDM cutting.

It is known in EDM practice that if an electrode connected to the negative terminal of a DC source is placed in close proximity to a current conducting workpiece connected to the positive source while a dielectric is caused to flow in the space between the electrode and the workpiece, material is spark discharged from the surface of the anodic workpiece confronted by the cathodic electrode. By advancing the electrode and workpiece toward each other at a velocity corresponding to the rate of the removal of material from the workpiece, holes may be drilled, cavities may be sunk, and contours may be shaped in the workpiece. The process is somewhat like ECM and electroplating in reverse, the only difference being that in electrochemical shaping the metal ions are prevented from plating upon the cathode by the rapidly moving electrolyte or by using an electrolyte composition which does not permit the metal to remain in solution.

The provision of a thin hard etched electrode for EDM provides the possibility for accuracies and intracacies not possible heretofore. Such spark discharge machining has many applications where conventional machining has many applications where conventional machining would fail, would be difficult, or would provide unsatisfactory results because of the hardness or lower machinability of the workpiece material, or where conventional machining would impose undue stress, or modify the physical properties of the workpiece material or of the machine surface. The present improved type of machining also presents other advantages over conventional machining in some applications because EDM as improved results in practically no tool wear, simplified operations and improved repeatability, accuracy, surface finish, and also affords considerable time saving over conventional machining. Also EDM machining leads naturally to automated operations and control by relatively unskilled workers.

The present invention relates to an etched electrode method for discharge machining intricate tools made of electrical conductive material or workpieces made of any material which are impossible or very difficult to machine by conventional machine means. Furthermore, even if the workpiece material is such as to be easily machined by conventional means, EDM as shown often results in considerable reduction of production costs and time saved over conventional methods. For example, an apertured mask containing hundreds of five mil holes accurately spaced would require several days to be manufactured by conventional methods. The same sort of mask may be manufactured by the method of the invention in a matter of several minutes.

The principle object of the invention therefore is to provide an improved method for machining intricate electrodes, EDM tools, and workpieces at considerable saving in time and cost as compared to old conventional methods of producing the same part.

Another object of the invention is to provide electrodes and intricate tools for spark discharge shaping, electrochemical eroding, and ultrasonically machining intricate workpieces made of material which could not be machined by conventional machine cutting such as milling, filing, grinding, etc., or made of a material very difficult to machine by such conventional means.

A further object of the invention is to provide an advanced EDM procedure for making intricate electrodes, tools, and parts without imposing undue mechanical or thermal stress upon such tools or parts in a manner that leads to high economic productivity and automatic or automated operations under control of relatively unskilled labor with high accuracy and extreme repeatability.

Another object of the invention is the application of artwork photoetch techniques to the production of thin hard electrodes for use in EDM processes.

Another object of the invention is to provide an improved time saving method of using EDM processes for making intricate tools or parts with a minimum of operations and machine setup procedures.

Another object of the invention is is the provision of an improved EDM process utilizing very thin hard replaceable electrodes which are aligned and supported outside the central unsupported erosion area, whereby deep, microscopic grooves, shapes and pins may be cut with straight sidewalls partly because of the superior flushing qualities associated with the thin electrode edges which furnish no repository for erosion particles to build up on electrode surfaces. In stead such particles are flushed away from the thin knife edges and accurate working surfaces are preserved for deep straight cuts which may involve more than one thin electrode.

A further object of the invention is the provision of an improved method of using an EDM apparatus by reversing the potential of electrode and workpiece so that as soon as the workpiece has been shaped as an intricate tool, it may remain in position and be used as a tool, by merely reversing the terminals to the pulse generator so that the tool becomes the negative electrode and particles are removed from a third piece which is now the workpiece. In the case of use of a tool bearing delicate and microscopic projections and patterns it is a definite advantage to avoid the handling of it whenever possible and in the present instance this is possible because machining of the tool is done directly in the EDM apparatus by the thin replaceable molybdenum electrode wafers while the intricate tool shaped thereby remains in the same position while made and used.

The invention also contemplates application of the improvements described above in whole or in part to the production of tools for cutting orifices, valves or channels of very small size or diameter with straight sidewalls in hard metallic material having for the objective the formation of fluid logic channels and passages, or for the extrusion orifices for the forming of filaments and fibers from plastic materials.

Another object of the invention is the provision of a method of making minute masks such as those used for fabricating and metalizing parts of semiconductor and other electronic devices, the present procedure involving the use of the thin molybdenum photoetched electrode which in turn enables the erosion of an intricately formed tool, which tool in turn provides the means for eroding the intricate mask which is to be utilized in connection with electronic component manufacture.

The foregoing and other objects, features and advantages of the invention will be apparent from the following more particular description of the preferred embodiments of the invention as illustrated in the accompanying drawings.

In the drawings:

FIG. 1A is a detailed view showing the relationship between the thin electrode and the workpiece to be cut deeply without particle buildup on the electrode and a consequent very effective flushing of the coolant and dielectric.

For examples of EDM and ultrasonic shaping devices in general, reference may be made to U.S. Pats. 2,550,366 and 2,580,716, respectively.

Although the emphasis herein is for use of the thin molybdenum electrode along with an EDM process, it is to be realized that the electromechanical processing known as ECM is also receptive to usage of an electrode in the same fashion. So also in the case of tools made by the present method, although emphasis is primarily on EDM usage, it will be realized that tools formed as shown herein are also usable as an ultrasonic shaping instrument, and also for use with ECM, and as well also as an ordinary punch in the case of ordinary punch and die usage in connection with processes such as punch press operation.

Figure 1:
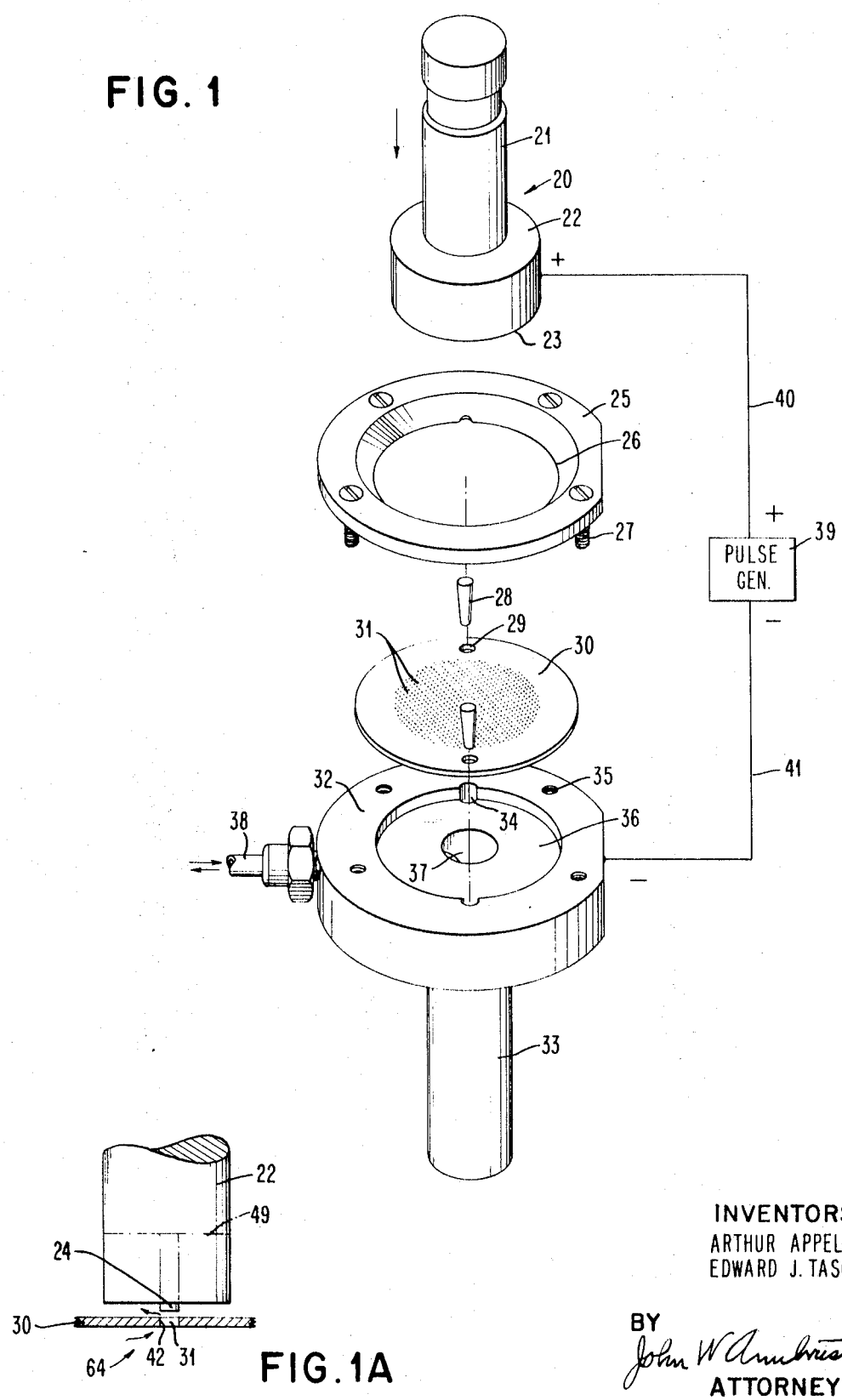
FIG. 1 is an exploded perspective elevation view showing the main EDM parts involved in the use of a thin etched electrode.

Referring now to the exploded showing of FIG. 1 it is seen that the main working parts such as the electrode 30 and the workpiece 20 are illustrated widely separated for purposes of illustration. However, as actually used, the two parts are very closely associated as illustrated near the bottom of FIG. 6. In FIG. 1 the part 20 is a workpiece of copper or copper tungsten or any metallic composition of steel, brass or alloys thereof subject to being shaped by EDM processing and in turn to later be used in the same position as an EDM tool or removed for use. The workpiece 20 comprises a clamping shank 21 and an enlarged head 22 having a downwardly facing surface 23 which in the present instance is to be formed with a large number of very tiny projecting pinlike extensions which are to be used later to erode a semiconductor diffusion mask to form therein a large number of openings arranged in an array of columnar and row openings through which dopants are brought into contact with semiconductor material In order to shape such pinlike projections on the surface 23, there is mounted in this EDM apparatus a novel form of electrode in the shape of a very thin molybdenum sheet or disc 30 shown near the center of the view. As illustrated, the disc 30 is provided with a central working area containing a large number of photoetched openings 31 which are surrounded by stock serving as erosion areas by means of spark discharge between the disc 30 and the surface 23 as prompted by current from the pulse generator 39 which is connected in the present instance so that the negative terminal through line 41 is attached to the holder for the disc 30 to function as the particle removing cathode, while the positive terminal through line 40 is connected to the part 20 as the anodic workpiece.

The thin molybdenum sheet or disc 30 is a relatively inexpensive and quickly etched replaceable part, but when in use it is accurately aligned in position and firmly clamped around its border so that the central portion containing the large number of openings 31 is unsupported to allow free movement of a flushing fluid or dielectric which is also a coolant for holding down the temperature at the point of spark discharge machining. In order to secure such a thin electrode 30, the cathode holding tool 33 is specially formed with an enlarged circular head 32 formed with an inner recess or dished out, cuplike portion 36 wherein a fluid inlet or outlet opening 37 is formed downward in communication with a lateral opening ending in a fitting for a fluid inlet pipe 38 fastened to the side of the enlarged head 32. The top surface of the head 32 is formed with a series of tapped openings 35 for receiving the holding screws through an enlarged circular mounting clamp or ring 25 which is also shaped with a dished-out central opening 26 for free access between the workpiece surface 23 and the top of the electrode 30.

The top 32 of the cathode head is also formed with a pair of pin receiving openings 34 which are in register with an aligning pair of openings 29 formed in the electrode disc 30. When the disc 30 is placed on the top surface of the head 32 and the holes 29 and 34 are brought into register, then a pair of drive pins 28 are inserted to not only register the disc 30 in an accurately placed position, but also secure it to the top of the cathode tool holder. Then the bordered clamping ring 25 is placed on top of the assembled tool 32 and disc 30, and the screws 27 therein are secured firmly into the tapped openings 35 to hold the three main parts together as an accurately aligned cathode tool having porous characteristics because of the unsupported center of disc 30 wherein the openings 31 are not only free to allow passage of the dielectric fluid, but also prevent a build up of eroded particles from distorting the desired cut into the surface 23 because the thin inner edges of the disc openings afford no foundation or repository surface for the eroded particles to adhere and distort the shape of the working cathode surfaces.

This free flushing feature of the invention is illustrated further in FIG. 1A where it is seen that the fluid 64 is free to move to and through the opening 31 and in doing so passes the opening edges 42 inflowing around the partially formed pin 24 which stands proud around the formed surface cut by the upper effective eroding surface of the molybdenum disc 30. This free flushing action continues even though the elongated pin 24 may be of a considerable length as noted by the dotted depth 49 illustrated in the workpiece 22. Should the workpiece 22 be of an extra hard material or the recesses surrounding the pins 24 be of exceptional depth, then there may be instances when the molybdenum disc 30 encounters a degree of tool wear inside the edges of the openings 31 and on other surfaces. In such instances, the thin electrode 30 first used, is removed and is easily replaced by again registering the second disc by means of similar alignment pin openings 29 as were used to hold the first used tool disc 30. Since the replacement disc 30 is made by the same photoetch artwork techniques and the same enlarged photograph used for all of the discs, there is full agreement in placement of all the central openings 31 with the register holes 29 since all such holes and register openings are made by the same photoetched photograph. With the working openings 31 and the register holes 29 being etched by the same process and by the same artwork there is no doubt of the agreement in position of all working surfaces of the cathode, and hence, substitution and replacement may be made for any of the thin discs for two or more times depending on the depth of the cut.

Another feature of the present invention which flows from the use of a thin metal sheet as the cathodic electrode will be made clear by reference to FIG. 1A. There it can be seen that the arcing edge 42 of opening 31 of thin metal sheet 30 is small compared to the depth to be eroded. The advantage of such an arrangement lies in the fact that as the electrode moves through the workpiece 22 it effects arcing only in the vicinity of the uneroded portion of the workpiece. Contrary to this an electrode which is not thin has a deep arcing edge or wall that effects arcing beyond the vicinity of the uneroded portion of the workpiece 22 thus affecting the regularity and steepness of the wall of pin 24.

Although wafer or disc 30 is mentioned predominately as being of molybdenum, it will be realized that other conductive metals or alloys of copper, tungsten, steel, tantalum, nickel, etc. may be used in the same fashion. As an example of the size of the thin sheet 30, it may be noted that it may be of other than a round shape and of a thickness in the order of 1 to 10 mils and having openings 31 which may be one to 5 mils in diameter and spaced on 5 to 10 mil centers in rows and columnar array. Of course semiconductor electrode channels, or fluid logic openings and shapes such as those of the 1 mil channel 61 shown on the tool of FIG. 5 may be photoetched in an electrode such as disc 30 instead of the small openings 31.

It is mentioned hereinbefore that the shaping of the central openings 31 and the alignment openings 29 of the molybdenum disc 30 are cut by photoetch techniques. Although the use of photographic artwork techniques for printed circuit use is well known, it is well to repeat some of the basic steps here as applied in a novel fashion to the formation of a thin hard sheet electrode such as that shown as disc 30. The first step in the artwork technique is the making of a large scale drawing in a scale of 10 or 1,000 times size according to the intricacies of the pattern and this is made in black ink on white sheet to provide a sharp and accurate contrast between the hole or depression shapes to be etched. Then there is a photographic reduction made to create a negative of the drawing and to bring it down in scale to a transparent tracing having a black background. This is followed by the step of coating the molybdenum or other metal sheet with a photosensitive resist such as commercially used and identified as KPR, KMER, or varieties thereof according to the nature of the metal to be etched. After this resist is dried there is a partial exposure of the resist on the sheet by placing the negative between a light source and the coated surface of the molybdenum sheet. The foregoing step is followed by developing of the photosensitized and exposed resist coating in order to expose the outline of the openings such as openings 31 to render them susceptible to the etching fluid. The tracing hole marks have prevented the underlying resist from being exposed to the radiations and therefore this portion of the resist can be removed by the solvent. After the pattern is exposed in the resist, then the molybdenum is etched by either chemical or electrochemical etching to remove the pattern of the sheets such as the openings 31 and 29. As an example of the etchant which may be used we may take note of the usual acid or alkaline solutions for metals in general and for molybdenum a potassium ferrocyanide, or a solution of one volume of concentrated nitric acid, one volume of concentrated sulfuric acid, and three volumes of water.

Figure 4:
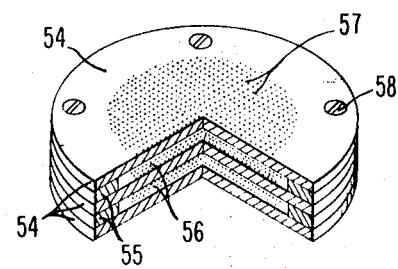
FIG. 4 is a detailed view partly in section showing a spaced laminated form of electrode comprising several thin etched sheets separated to provide passage for the flowing coolant fluid dielectric.
Figure 6:
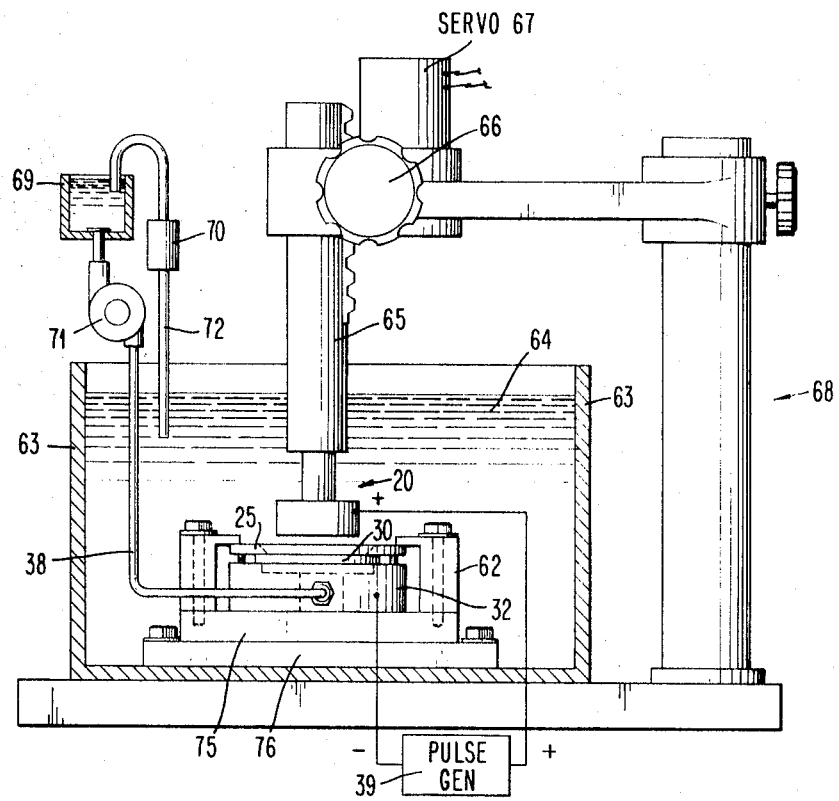
FIG. 6 is a side elevation view showing in a schematic way an example of an EDM device.

When the foregoing series of artwork steps are repeated using the same transparent tracing in connection with a whole series of molybedenum sheets, it will be realized that a stack of identical electrode parts are created and have patterns therein in identical register because they were made by the use of the same artwork tracing. Such an electrode sheet 30 may be used singly, as illustrated in FIGS. 1 and 6, or a stack of such thin electrodes may be assembled as shown in FIG. 4 where the separate electrodes are identified as parts 54 having an internal pattern 57. There they are stacked with ring spacers, or separaters 55 shown assembled by screws 58 to provide inner spacings 56 where the electrodes are centrally exposed but separated so that the novel type of flushing is repeated two or more times because of the open cavernous nature of the stacked but separated assembly of FIG. 4. It is understood that such an assembly may be used to replace the single electrode sheet 30 wherever it is advisable to make a quick deep erosion of an extra hard part having an intricate pattern. The shims or separators 55 shown in a ring form may be of any other square, triangular, or rectangular formation according to the outline of the pattern so long as the inner working surfaces remain unsupported and exposed. These separators or shims may be made of steel or any other hard material adapted to maintain its shape and be conductive.

Figure 3:
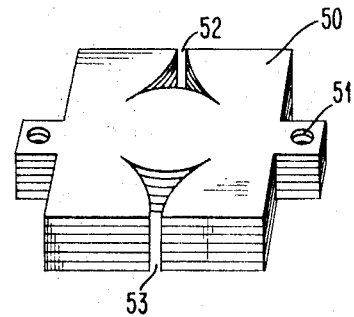
FIG. 3 is a detailed view showing a laminated form of thin etched electrode.

Another form of laminar electrode made up of thin sheets is shown in FIG. 3. There it is noted that the laminations 50, which may be of photoetched molybdenum, are stacked in direct contact and form a thick cathodic electrode tool composed of relatively thin members which are easily photoetched to substitute for a thick part having such an intricate shape as to be difficult to be machined by conventional cutting. The electrode 50 is shown with two recess shapes 52 and 53 having an inner corner which would be difficult to create by conventional machining but which is easily etched by the phototechnique enumerated hereinbefore. The electrode 50 is also formed with etched outlines and alignment openings 51 which also subject it to accurate registration when assembled as the cathode working portion of a thick cathode tool.

Figure 5:
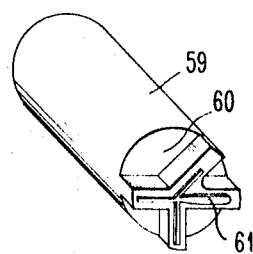
FIG. 5 is a detailed perspective view of an electrode shaped to be used as a tool for cutting fluid logic openings, said pattern of tool shape being previously cut in its minute and intricate shape by means of a thin etched electrode.

In order to illustrate the versatility of the thin electrode process of the present invention, there is shown in FIG. 5, a tool for creating fluid logic channels as made by the thin electrode process of the present invention. This tool 59 is shown with enlarged cutout areas 60 which may be cut by conventional methods to form a platform upon which it is desired to form an EDM or ECM or ultrasonic die shape involving projections so tiny and intricate as to be difficult to machine by conventional methods. For example, the long ridges shown emanating from the fluid logic projection 61 may be only one mil in width and of a substantial length and require straight sidewalls. It is understood that the negative of the shape 61 would be photoetched in a thin electrode sheet in order to make the tool 59 when the same is mounted in the same fashion as the tool 20 as the workpiece illustrated in FIG. 1. After being worked upon by EDM process in the presence of the thin molybdenum electrode, the tool is ready to be used in turn by itself to shape other materials by any of the processes enumerated to form the intricate and microscopic fluid logic openings in various types of materials, metallic or plastic, as the case may be.

Returning to observation of FIG. 1 it may be restated that the purpose of the parts shown there is to form on the surface of the workpiece 20 a series of extending pins which are to be shaped by spark machining as determined by the openings 31 in the thin molybdenum disc or sheet 30. When such processing has been performed, then the bottom surface 23 of workpiece 20 becomes shaped as the tool 20 shown in FIG. 2 where it is noted that the bottom of tool 20 now has a series of extending pins 24 which are ready to perform work on some other object, providing that the electrodes of the pulse generator 39 are reversed so that the upper tool 20 now becomes the cathode and has the negative connection through line 41 while the bottom line 40 carrying the positive terminal is connected to the lower holder 32 which now becomes the anode to hold the workpiece 43. This workpiece 43 is of a more substantial thickness than the original molybdenum mask and it too is formed of some hard resistant material such as tantalum, molybdenum, tungsten, etc., and is to be used as a diffusion control mask in the making of semiconductor doped arrays when once the openings 46 therein have been eroded by the assembly of EDM parts noted in FIG. 2. In other words, the mask 43 is to be shaped substantially the same as the pattern of shape of the electrode 30 but by means of the EDM process in dealing with such thick hard masking material such as carbides, tungsten or molybdenum or alloys thereof, as distinguished from the shaping of the thin electrode 30 by an accurate photoetch process, with the combination workpiece and tool 20 being the intermediary in imparting the advantages of each process to the final product of an accurate mask 43 with a whole set of openings 46 accurately shaped and registered relative to a pair of preformed registering openings 44.

Figure 2:
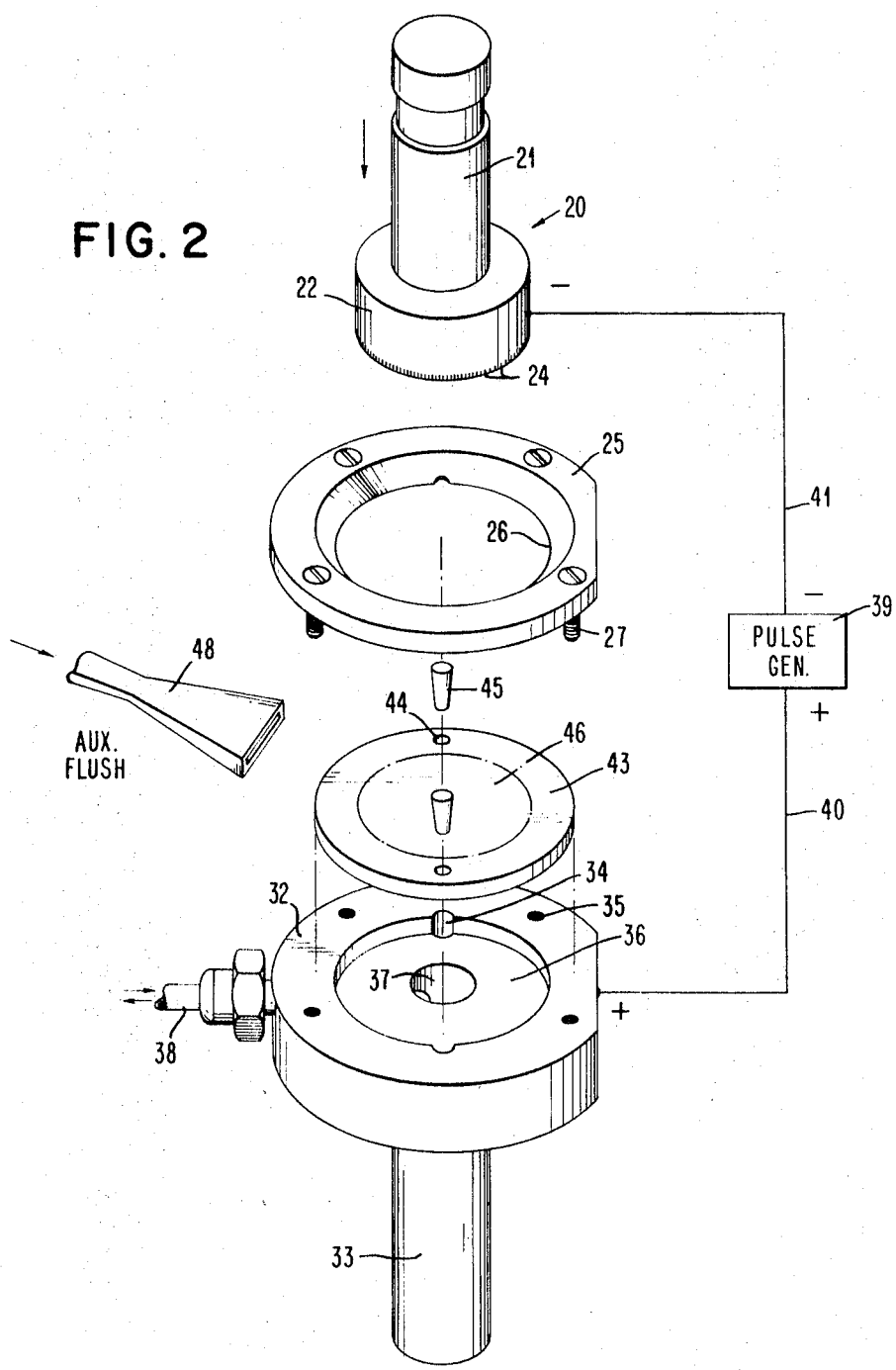
FIG. 2 is an exploded perspective elevation view showing the parts for an EDM process wherein the tool formed as the workpiece in FIG. 1 is used in FIG. 2 in turn to cause EDM formation of a mask to be used for electronic part fabrication.

As noted in FIG. 2 the workpiece 20 which is now the cathode tool, remains in its clamped position and the replacement is made by removing the electrode 30 and substituting the mask disc or wafer 43. This disc 43 has the alignment openings 44 which are registered with the openings 34 in the lower electrode 33. An attachment is made thereto by a pair of pins 45 driven into the mask to secure it to the top surface of the enlarged portion 32 of the lower electrode which is now the anode to carry the part to be eroded. The same clamping ring 25 is secured to the top of the combined assembly of electrode 33 and mask 43 and attached thereover by means of screws 27 threaded into the openings 35 of the lower anode to hold the parts together as the tool 20 is brought down into close relationship with the top surface of the mask 43 to begin the eroding operation by sparking caused through pulse generator 39 attached in the reverse fashion of FIG. 1, so that now the top element 20 is the cathode with extending pin surfaces 24 and the lower parts including the mask 43 become the anode to be eroded with hole openings in area 46.

Under such conditions existing when an imperforate anode part such as mask 43 is presented above the hollow electrode 32, then an auxiliary flushing apparatus such as 48 may be brought into operation to direct the flushing dielectric above the surface of the mask 43 rather than endeavor to direct it through the interior of the anode 32 by means of the usual connection through line 38. The spark machining of mask 43 is caused by the tips of the pins 24 on the tool 20 gradually approaching and penetrating the mask 43 as the erosion process takes place simultaneously accompanied by the pulsing of the generator 39 and flushing through the auxiliary flushing line 48.

Although tool 20 is illustrated in FIG. 2 as performing its cutting function by means of the EDM process, it will be realized that a tool of that kind already formed by the thin etched molybdenum sheet process may be used as well for ECM forming, or used as an ultrasonic tool, or directly as a mechanical die punch. The same range of diverse usefulness also applied to the different forms of tools illustrated in FIGS. 3, 4 and 5 as well.

As illustrated in FIG. 6, the EDM apparatus 68 includes a sturdy base and frame with the top workpiece 20 (assuming a type of operation as in FIG. 1) mounted in the end of a vertical spindle 65 adjusted vertically by an approximating lowering hand wheel 66 which is superseded in automatic operation during erosion by an accurately controlled automatic servo device 67 for maintaining proper gap spacing between the working surface of the electrode 30 and the bottom face of the workpiece 20.

A container tank 63 is filled with the dielectric coolant fluid 64 is assembled on the apparatus and in it the working parts are immersed in the fluid during the spark erosion operation. Attached to the bottom of tank 63 is a base frame 76 carrying an insulation holder 75 for supporting the main cathode frame 32 to which is attached the negative electrode of the pulse generator 39, while the other positive electrode is attached to the workpiece 20. A plurality of clamping means 62 are arranged around and on top of the clamping ring 25 to hold the entire cathode electrode including the working sheet of molybdenum 30 in a secure position near the bottom of the tank, and it is the top spindle 65 with the lower workpiece 20 which is moved slowly downward during the erosion operation.

A pump assembly including the pump 71 and a dielectric reservoir 69 and a filter 70 take care of the efficient circulation of the dielectric fluid 64 from the reservoir tank 69 and down through the fluid input pipe 38 and into the hollow cathode body 32. Recirculation is established through the combination pump and filter 70 and the exhaust pipe 72 for drawing the fluid 64 up into the reservoir 69. As noted hereinbefore, the direction of flow of the fluid dielectric may be varied and directed through an auxiliary flushing tube above the cathode as well as upward in through the lower cathode depending largely on the nature of the work in process and whether the lower electrode is to be used as the cathode or anode and also as to the porosity of the electrode or workpiece mounted in the lower position. Then it is also possible to reverse the direction of the pump 70 and 71 so that there is a suction effect with respect to the dielectric fluid as an alternative to the forwardly moving flushing effect.

While the invention has been particularly shown and described with reference to preferred embodiments, it will be understood by those skilled in the art that various changes in form and detail may be made therein without departing from the spirit and scope of the invention.

We claim:

1. A process for fabricating a device of intricate contour from a workpiece comprising:
    making a transparency of the negative pattern of a cross section of said contour;
    photoetching said negative, using said transparency, through each of a plurality of thin sheets of metal having a thickness of from about one to ten mils to reproduce said pattern in each sheet; and
    using said thin sheets of metal with photoetched negative as a cathodic electrode worktool in an electrical discharge machining process so that said cathodic electrode exhibits a single negative pattern with the plane of said cross section perpendicular to the direction of erosion of said workpiece to be shaped into said device.

2. A process of the kind set forth in claim 1 wherein, after said device has been fabricated, said electrical discharge machine process further involves:
    reversing the polarity of said electrical discharge so that said device becomes a new cathodic tool for electrically eroding the said negative pattern of a cross section; and substituting a new workpiece in the position of the previously cathodic electrode, whereby the positioning of said new cathodic tool is accurately preserved because it is shaped and used in the same position.

3. A cathodic electrode for use in electrical discharge machining comprising:

a plurality of thin conductive sheets each having an etched planar working pattern which is the negative of a cross section taken perpendicular to the direction of erosion of the pattern to be eroded and etched alignment openings which allow said sheets with working pattern to be aligned and stacked together to form an electrode device difficult to machine as a solid tool.

4. An electrode of the kind set forth in claim 3 wherein said plurality of conductive sheets are stacked with spacers between them to form a thick cavernous cathodic tool.

5. In an electrical discharge machining apparatus including an anodic workpiece having a surface to undergo erosion and a cathodic electrode to effect said erosion into said surface, said cathodic electrode comprising a plurality of laminated thin conductive sheets, each sheet having a thickness of the order of several mils and a planar working pattern of photoetched apertures having widths of the order of several mils, said pattern corresponding to a cross-sectional negative of the pattern to be eroded in said anodic workpiece, said sheets accurately positioned and arranged by mounting means and photoetched alignment apertures in said sheets so that the plane of said pattern precisely moves with respect to said surface to thereby affect deep workpiece erosion.

6. An apparatus of the kind set forth in claim 5 wherein said thin conductive sheets are molybdenum sheets of a thickness in the order of one to ten mils and the said photoetched apertures of said working pattern are in the order of one mil widths.

7. In an electrical discharge machining apparatus including an anodic electrode assembly having an anodic workpiece with a surface to be eroded and a cathodic electrode assembly having a cathodic electrode for eroding said surface, power supply means coupled between said anodic electrode assembly and said cathodic electrode assembly, said cathodic electrode assembly including a thin metallic electrode sheet having a thickness of the order of from about one to ten mils and having a central planar working pattern of photoetched apertures having widths of the order of several mils, and means for holding said sheet exterior to said pattern so that the plane of said sheet moves with respect to the said surface to be eroded, said means for holding including alignment pins and said thin metallic sheet including photoetched alignment apertures exterior to said central working pattern for receiving said alignment pins to thereby allow said thin metallic sheet to be replaced by another thin metallic sheet having a pattern of apertures which is a duplicate of the pattern of apertures of the replaced thin metallic sheet and having alignment apertures which duplicate in size and position the alignment apertures of the said replaced thin metallic sheet.

8. The apparatus as set forth in claim 7 wherein said power supply polarity is reversed such that the workpiece of said anodic electrode assembly machined by said metallic electrode sheet becomes a cathodic work electrode for machining a further workpiece.

9. An eroding apparatus for producing minute intricate tool patterns comprising, a reservoir of dielectric fluid, an anodic workpiece immersed in said dielectric fluid, a cathodic tool adjacent said workpiece, said cathodic tool including a plurality of thin photoetched sheets of conductive material stacked together to form an electrode to erode particles from the working surface of said workpiece, a mounting means for clamping said electrode with its center unsupported and its outerbounds clamped so that the plane of said thin sheets moves with respect to the said working surface of said workpiece, said electrode being immersed in said dielectric fluid and offering a relatively free flushing path to the flow of said dielectric and said particles, and an electrical discharge means connected between said workpiece and said electrode to erode deep intricate patterns into said workpiece as determined by the replacement of said electrode depending on the depth and accuracy desired for the intricate shapes eroded in the workpiece.

10. An EDM apparatus for producing minute intricate tool patterns comprising, a reservoir of dielectric fluid, an anodic workpiece immersed in said dielectric fluid, a cathodic tool adjacent said workpiece, said cathodic tool including a plurality of thin sheets of metal, each with photoetched working patterns, stacked one above the other with spaces therebetween to form a photoetched deep erosion electrode to erode particles from the working surface of said workpiece, mounting means for clamping said thin sheets of metal stacked one above the other so that their centers are unsupported and their outerbounds clamped and with the plane of said thin sheets parallel with the said working surface of said workpiece, said centers being immersed in said dielectric fluid and offering relatively free flushing path to the flow of said dielectric and said particles, an electrical discharge means connected between said workpiece and said photoetched electrode to erode deep intricate patterns into said workpiece, and alignment openings etched into said thin sheets in the same photoetch operation which forms said working pattern, and registering means on said mounting means for registering and aligning the position of said sheets in accordance with the said alignment openings etched therein.

11. An EDM apparatus for producing minute intricate workpiece patterns comprising, a reservoir of dielectric fluid, an anodic workpiece immersed in said dielectric fluid, a cathodic tool adjacent said workpiece, said cathodic tool including a thin sheet of metal from 1 to 10 mils thick having a highly accurate and reproducible photoetched working pattern arranged to form a thin metal sheet electrode to erode particles from the working surface of said workpiece to be eroded, a mounting means for clamping said thin sheet electrode with its center unsupported and its outerbounds clamped and with the plane of said thin sheet electrode parallel with the said working surface of said workpiece, said electrode center being immersed in said dielectric fluid and offering a relatively free flushing path to the flow of said dielectric and said particles, and electrical discharge means connected between said workpiece and said thin sheet electrode to erode deep intricate patterns into said workpiece as determined by the replacement of two or more of such reproducible thin sheet electrodes depending on the depth and accuracy desired for the intricate shapes eroded in the workpiece, and alignment openings etched into said thin sheet of metal in the same photoetch operation which forms the said working pattern of said sheet electrode, and registering means on said mounting means for registering and aligning the position of said sheet electrode in accordance with the said alignment openings etched therein.